Nov. 8, 1938.  A. C. HANSCH ET AL  2,135,507
CAMERA STOP DEVICE
Filed Feb. 25, 1937   3 Sheets-Sheet 1

INVENTORS
AUGUST C. HANSCH
HENRY E. HANSCH
BY Clark & Ott
ATTORNEYS

Nov. 8, 1938.    A. C. HANSCH ET AL    2,135,507
CAMERA STOP DEVICE
Filed Feb. 25, 1937    3 Sheets-Sheet 2
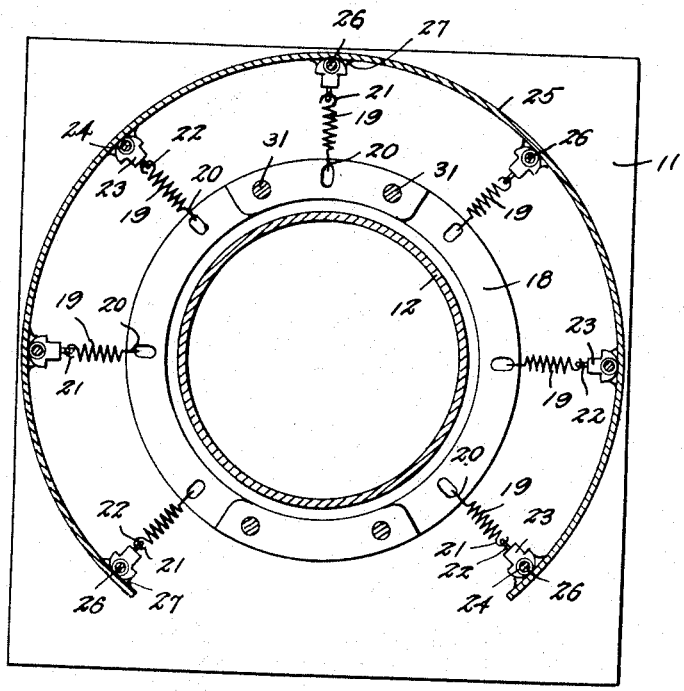
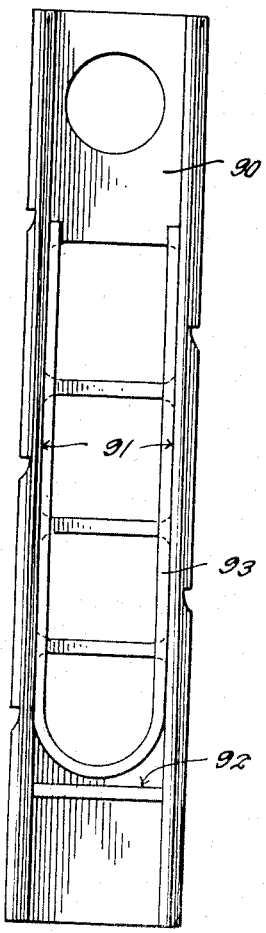
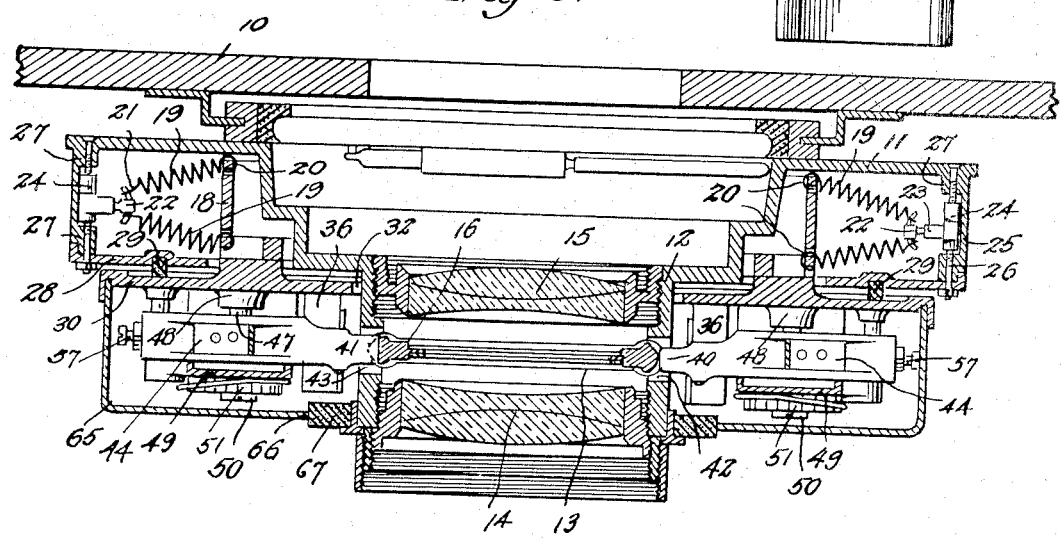
INVENTORS
AUGUST C. HANSCH
HENRY E. HANSCH
BY
Clark & Ott
ATTORNEYS Nov. 8, 1938.  A. C. HANSCH ET AL  2,135,507
CAMERA STOP DEVICE
Filed Feb. 25, 1937  3 Sheets-Sheet 3

INVENTORS
AUGUST C. HANSCH
HENRY E. HANSCH
BY
Clark + Ott
ATTORNEYS

Patented Nov. 8, 1938

2,135,507

UNITED STATES PATENT OFFICE 2,135,507

CAMERA STOP DEVICE

August C. Hansch, Cliffside, and Henry E. Hansch, Whippany, N. J.; said August C. Hansch assignor to Frank J. McCann and John F. Monahan Application February 25, 1937, Serial No. 127,710

16 Claims. (Cl. 95—64)

This invention relates to a stop device which while not necessarily restricted thereto is primarily designed for cameras employed in the production of screen negatives or positives, the same being an improvement upon a similar device disclosed in our co-pending application, Serial No. 76,446, filed April 25, 1936.

The invention has reference to a camera for the photographic production of screen negatives or positives by the successive exposure of a film or plate through a plurality of stop openings, which is effected by employing a movable stop element having a plurality of fixed stop openings of various sizes mounted for step by step guided movement through a slot in the lens barrel between the components of the camera lens.

The present invention is particularly directed to an improved means for supporting the stop element and the mechanism for actuating the same, so as to preclude the transmission of shocks or jars to the camera and camera lens which may result in a blurred image.

The invention further provides in a stop device of the indicated character, means for arresting the movement of the stop element with the stop openings successively in registry with the camera lens which means is so constructed, arranged and mounted as to absorb the shock or jar incident to the arresting of the movement of the stop element to prevent transmission of shocks and jars to the camera and camera lens.

More specifically the invention provides in a stop device, a mounting for the stop element and guide means for the arresting means which mounting is resiliently suspended in surrounding spaced relation to the lens barrel whereby shocks and jars incident to the operation of the stop device are effectually absorbed by the suspension means so as to positively insulate the camera and camera lens therefrom while insuring the proper registration of the stop openings with the camera lens.

As a further feature the invention comprehends in a stop device which includes a retractible latch adapted to engage with the stop element for successively arresting the movement thereof, spring means which, in addition to projecting the latch into stop element arresting position, functions to provide a shock absorbing medium which accurately disposes and supports the stop element in its successive pre-determined relations to the camera lens.

The invention further makes provision for adjusting the tension of the shock absorbing means of the mounting and of the stop element arresting means and for adjusting the stop device with reference to the lens so as to insure proper registration of the stop openings in the lens.

A still further object of the invention resides in the provision of a slotted housing for a camera stop device through which the stop element extends, with yieldable non-shock transmitting means engaging or in substantial engagement with the stop element adjacent the slot for excluding the entrance of undesirable light and its possibility of reaching the lens and blurring the image.

As a further feature the invention comprehends a magnetic stop plate holder which functions to greatly facilitate the operation of changing the stop plates.

With the above enumerated and other objects in view, the invention is more particularly set forth in the following specification, illustrated in the accompanying drawings and pointed out in the appended claims which are intended to cover variations and modifications falling within the scope of the invention.

In the drawings:

Fig. 4 is a vertical sectional view taken approximately on the line 4—4 of Fig. 2.

Fig. 5 is an enlarged horizontal sectional view taken approximately on the line 5—5 of Fig. 1.

Fig. 6 is a front view of the stop plate holder.

Figure 1:
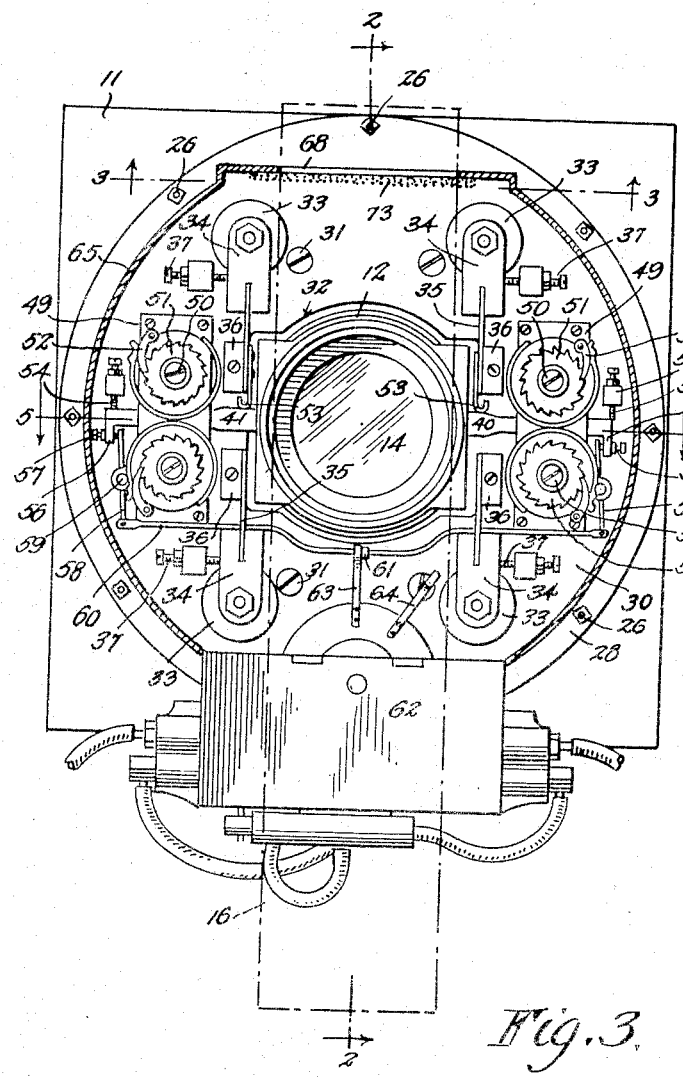
Fig. 1 is a front view of the stop device with the housing shown in section and the stop element in broken lines.
Figure 2:
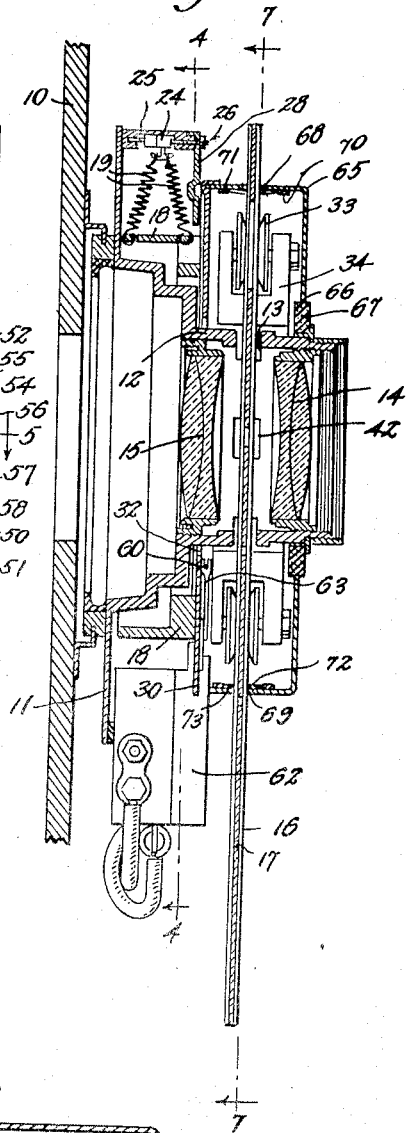
Fig. 2 is a vertical sectional view therethrough taken approximately on the line 2—2 of Fig. 1.
Figure 3:
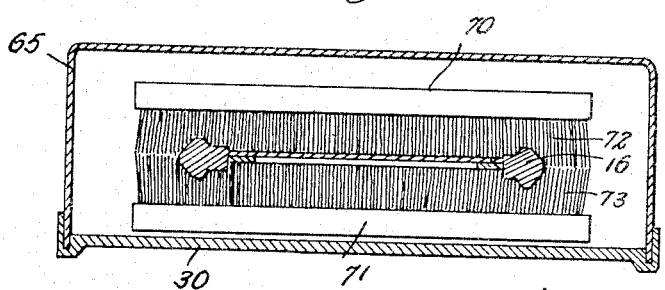
Fig. 3 is an enlarged horizontal sectional view taken approximately on the line 3—3 of Fig. 1.
Figure 7:
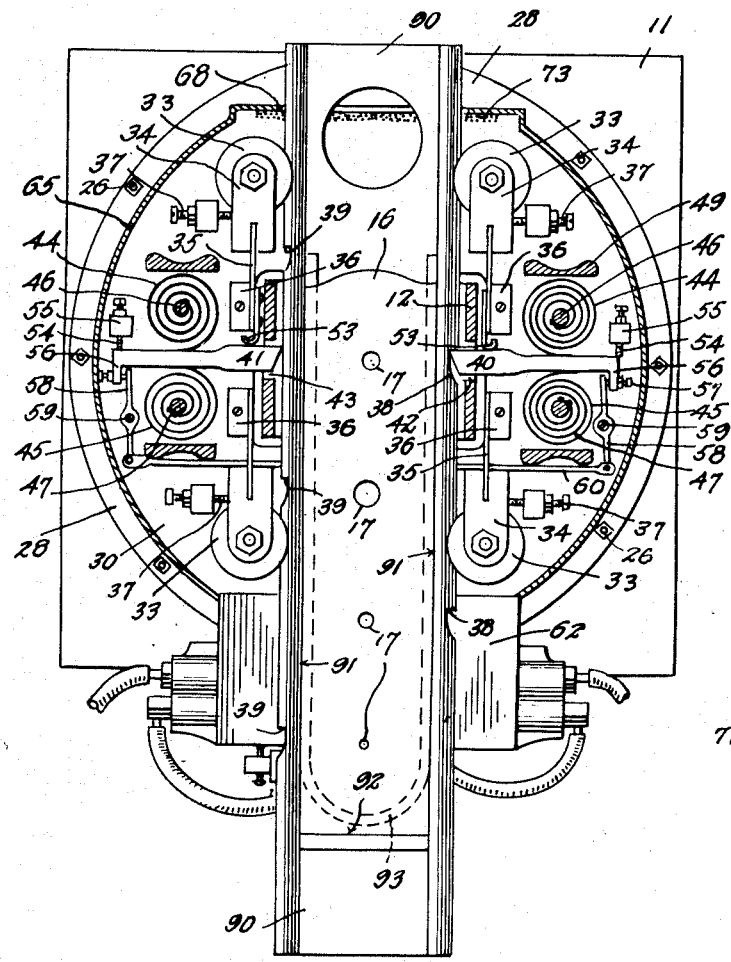
Fig. 7 is a vertical sectional view taken approximately on the line 7—7 of Fig. 2.

Referring to the drawings by characters of reference, 10 designates the front board of a camera to which is rigidly attached the base plate 11 of a lens barrel 12 having a vertical passageway 13 located between the front and rear lens components 14 and 15. A stop element 16 having a plurality of stop openings 17 is adapted for movement through the passageway 13 to successively dispose the stop openings in registration with the camera lens.

The invention consists of an improved means for supporting and guiding the stop element 16 with reference to the lens barrel and camera, which means includes a mounting ring 18 surrounding the lens barrel and resiliently suspended in spaced relation thereto by a plurality of pairs of radial outwardly extending springs 19, the springs of each pair being connected at their inner ends 20 with the mounting ring at axially spaced points and connected at their outer ends 21 with the hooked terminals of a threaded stud 22 which engages in a boss 23 of a sleeve 24. Each sleeve 24 is anchored against radial movement to the fixed rim 25 of the lens barrel base 11, but is adjustable longitudinally towards and away from the base by a screw 26 which swivelly engages bearing bosses 27 on the rim 25.

A removable annular covering flange 28 is secured to the forward edge of the rim 25, with its inner periphery being of slightly larger diameter than the diameter of the mounting ring 18 and the covering flange is provided with forwardly protruding yieldable bearing gasket sections 29 of sponge rubber or any equivalent material to serve this purpose.

A mounting plate 30 is secured by screws 31 to the mounting ring 18 and the central portion of the mounting plate is centrally cut out as at 32 to provide an opening which is of sufficient size to provide a clearance between the lens barrel and the mounting plate. The rear surface of the mounting plate 30 engages with the yieldable gasket sections 29 and it will thereby be observed that a mounting assemblage is provided and supported in juxtaposition to the lens barrel and lenses in such a manner as to preclude the transmission of shocks or jars to the camera or camera lens from the mounting.

On the forward surface of the mounting plate 30, vertically spaced pairs of guide sheaves 33 are mounted for guiding the stop element 16 through the lens barrel passageway 13, while maintaining the stop element out of contact with the lens barrel. The guide sheaves are rotatably mounted in forked bearings 34 which are carried by leaf springs 35 anchored to lugs 36 projecting forwardly from the forward surface of the mounting plate 30 and set screws 37 are utilized to adjust the tension of the sheaves 33 against the opposite side edges of the stop element 16.

The opposite side edges of the stop element 16 are provided with keeper notches 38 and 39 with which projectible and retractible latches 40 and 41 are alternately engaged and released respectively to effect a step by step gravitational movement of the stop plate through the lens barrel passageway so as to successively dispose the stop openings 17 in registration with the camera lens. The latches 40 and 41 protrude through openings 42 and 43 on diametrically opposed sides of the lens barrel and said openings are of a sufficient size to provide ample clearance for said latches to prevent any possibility of contact of the same with the lens barrel.

It is apparent that in arresting the gravitational movement of the stop plate, vibrations or shocks and jars may result which if allowed to be transmitted to the lens barrel, lenses or camera, would result in a blurred negative or positive. In order to absorb the shocks and jars incident to the arresting of the gravitational movement of the stop element 16, each latch is resiliently supported on the forward surface of the mounting plate 30. As shown, the means of support for each latch consists of a pair of oppositely wound spiral springs 44 and 45, the outer terminals of which springs are secured to the upper and lower sides of the latches and the inner terminals of which are secured respectively to shafts 46 and 47 journaled in bearing bosses 48 on the forward surface of the mounting plate 30 and journaled in the face plates 49 which are supported forwardly of the bearing plate. The shafts 46 and 47 protrude forwardly from the face plates 49 and are provided with kerfed forward ends 50 for rotating the shafts to vary the tension of the spiral springs. The forwardly protruding portions of the shafts have secured thereto ratchet disks 51 with which the pawls 52 engage to secure the adjustment of the spring tension.

It will be observed that the spiral springs are coiled in directions to exert a tension for normally projecting the latches into engagement with the opposite side edges of the stop element 16, while at the same time said springs function to permit the latches to yield downwardly under the weight of the stop element when arresting the downward movement thereof.

In order to insure the proper registration of the axis of the stop opening with the axis of the camera lens, a pair of upper guides 53 and 54 cooperate with the upper surface of each latch. The guides 53 are mounted for vertical adjustment on the lugs 36 by means of screws extending through slotted portions thereof. The guides 54 are also adjustable and are here shown as screws threaded through a bearing lug 55 carried by the forward face of the mounting plate 30.

The outer end of each of the latches 40 and 41 is provided with a depending finger 56 having an adjustable contact screw 57 with which a lever 58 is adapted to engage for retracting the latch against the tension of the springs 44 and 45. The levers 58 are fulcrumed as at 59 intermediate their ends and the lower ends are coupled together by a transversely movable shift rod 60 which is provided with an intermediate abutment element 61. Any desired means for alternately shifting the shift rod 60 may be utilized, but as herein conventionally illustrated, the same consists of a vacuum motor 62 having a pair of arms 63 and 64. It is obvious that when the arm 63 is swung to the right, as shown in Fig. 1, the shift rod is moved to the right hand position shown which causes the upper end of the left hand lever 58 to be moved to the left thereby retracting the latch 41. Coincident with this movement of the left hand lever 58, the upper end of the right hand lever moving to the left will permit the springs 44 and 45 to exert their normal tension to project the latch 40 into operative position.

From the foregoing it will thus be apparent that the shocks and jars incident to the arresting of the gravitational movement of the stop element 16 will be absorbed and dissipated by the springs 44 and 45, but if perchance the entire shock or jar is not absorbed by said springs, the remainder will be transmitted to the mounting plate 30 and mounting ring 18 which due to its resilient mounting with reference to the lens barrel and camera will preclude any possibility of vibration being transmitted to the lenses or camera. The vacuum motor 62 being also secured to and carried by the mounting plate 30 will insulate the lenses and camera from vibrations in the operation of said motor.

The guide sheaves 33 and the latches 40 and 41 together with their actuating means are housed by a casing section 65 secured to the mounting plate 30 and provided with an opening 66 in its forward wall surrounding the lens barrel through which it protrudes. The opening 66 is spaced from the lens barrel and the space therebetween is closed by a yieldable resilient gasket 67 of sponge rubber or an equivalent material which excludes the entrance of light in this region, while preventing the transmission of shocks through the casing section to the lens barrel. The upper and lower portions of the casing section 65 are provided with slots 68 and 69 through which the stop plate extends and means is provided adjacent said slots for excluding the light which means consists of pairs of brushes 70 and 71 having flexible bristles 72 and 73 which extend into contact with each other and provide flexible light excluding means engageable with the stop element 16.

By virtue of the foregoing construction, it will be appreciated that the stop element 16 with its supporting, guiding and actuating means is so mounted as to insulate the lens barrel, lens and camera from any possible shocks or jars incident to the operation of the stop device.

Figure 8:
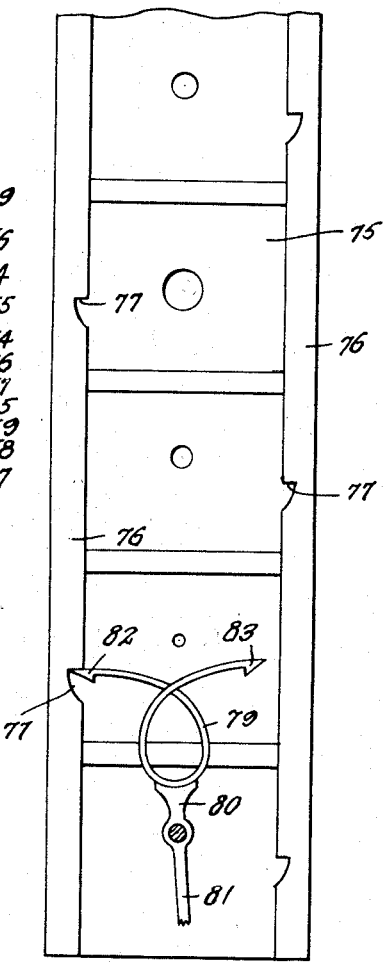
Fig. 8 is a fragmentary rear face view of a stop element and arresting means therefor disclosing a modified adaptation of the invention.

In the modified form of the invention illustrated in Fig. 8, an alternative form of stop element arresting means is shown in which the stop element 75 is provided with longitudinally extending rims 76 at its opposite side edges having keeper notches 77 at the inner edges of said rims. In lieu of the projectible and retractible latches 40 and 41, a spring is provided, having an intermediate loop 79 which is attached to a lever 80 fulcrumed as at 81. The spring 78 is provided with terminals 82 and 83 which are adapted to alternately engage with the keeper notches 77 when the lever is tripped from one angular position to the other. Obviously, in this form of arresting means, the spring 78 will provide a resilient shock absorbing means when arresting the movement of the stop element, while providing a tension at its opposite terminals to shift the same into the keeper notches as said notches register with the terminals during the gravitational descent of the stop element.

As particularly illustrated in Fig. 6 of the drawings, the stop element 16 preferably includes a holder 90 with which a plurality of removable stop plates 16 having stop openings 17 of various sizes and shapes are selectively associated, the said stop plates are adapted to be positioned between the longitudinally extending side ledges 91 and engage at their lower ends with a lower ledge 92 and are held in position by a permanent magnet 93 which is secured to the holder, it being understood that the stop plates are of a material which is subject to magnetic attraction.

What is claimed is:

1. In a camera stop device, a stop element having a plurality of fixed stop openings, means for guiding the stop element for movement to successively dispose the stop openings in registration with the camera lens, means resiliently supporting said guiding means, means for arresting the movement of the stop element, a mounting for said arresting means, and spring supporting means carried by the camera for resiliently suspending the mounting with reference to and independent of the camera lens barrel so as to absorb shocks and jars incident to the operation of the stop device.

2. In a camera stop device, a stop element having a plurality of fixed stop openings, means for guiding the stop element for movement to successively dispose the stop openings in registration with the camera lens, means for arresting the movement of the stop element, a mounting therefor surrounding the camera lens barrel in spaced relation thereto, means carried by the camera resiliently suspending the mounting together with the arresting means and the stop element for absorbing shocks and jars incident to the operation of the stop device, and resilient means on said mounting for resiliently supporting the stop element arresting means and for absorbing shocks incident to the arresting of the movement of the stop element.

3. In a camera stop device, a stop element provided with a plurality of fixed stop openings and having gravitational movement to successively dispose the stop openings in registration with the camera lens, means for arresting the movement of the stop element, a mounting therefor, and cooperating means carried by the mounting and the camera for supporting and resiliently suspending the mounting with reference to the camera lens barrel so as to absorb shocks and jars incident to the operation of the stop device.

4. In a camera stop device, a stop element provided with a plurality of fixed stop openings and having gravitational movement to successively dispose the stop openings in registration with the camera lens, means for guiding the stop element between the camera lens and for arresting the movement of the stop element, a mounting therefor having a casing surrounding the camera lens and provided with oppositely disposed slots through which the stop element extends, and means carried by the camera for supporting the mounting, the casing and stop element guiding and arresting means and for resiliently suspending the same with reference to the camera lens barrel so as to absorb shocks and jars incident to the operation of the stop device.

5. In a camera stop device, a stop element having a plurality of fixed stop openings means for guiding the stop element for movement to successively dispose the stop openings in registration with the camera lens, means for arresting the movement of the stop element, a mounting therefor surrounding the camera lens barrel, and radially disposed resilient means connecting the mounting and camera for suspending and sustaining said mounting in spaced relation to the lens barrel to absorb shocks and jars incident to the operation of the stop device.

6. In a camera stop device of the character set forth, a stop element having a plurality of fixed stop openings, means for guiding the stop element, retractible latch means adapted to engage with the stop element to successively arrest the movement thereof, a mounting for said guide and latch means, means connected between the camera and mounting for supporting and resiliently suspending the mounting in surrounding relation to the camera lens barrel to absorb shocks and jars incident to the operation of the stop device, and spring means carried by the mounting for projecting the latch means to arresting position and for absorbing shocks incident to the arresting movement of the stop element.

7. In a camera stop device of the character set forth, a stop element having a plurality of fixed stop openings, means for guiding the stop element, retractible latch means adapted to engage with the stop element to successively arrest the movement thereof, a mounting for said guide and latch means resiliently suspended in surrounding relation to the camera lens barrel to absorb shocks and jars incident to the operation of the stop device, and opposed coiled spring means for projecting the latch means to arresting position and for absorbing shocks incident to the arresting movement of the stop element.

8. In a camera stop device of the character set forth, a stop element having a plurality of fixed stop openings, means for guiding the stop element, retractible latch means adapted to engage with the stop element to successively arrest the movement thereof, a mounting for said guide and latch means resiliently suspended in surrounding relation to the camera lens barrel to absorb shocks and jars incident to the operation of the stop device, spring means for projecting the latch means to arresting position and for absorbing shocks incident to the arresting movement of the stop element, and means for adjusting the tension of the resiliently suspended mounting and the spring means.

9. In a camera, a lens barrel having a passageway extending completely therethrough perpendicular to the axis thereof, a stop element having a plurality of fixed stop openings, means for supporting said stop element for guided step by step movement through said passageway to successively dispose the stop openings in registration with the camera lens, a mounting for said supporting means, means carried by said mounting for excluding light from entering through said passageway and means connected between the camera and the mounting for resiliently suspending the mounting in surrounding spaced relation to the camera lens barrel.

10. In a camera, a lens barrel having fixed relation to the camera and provided with a passageway extending completely therethrough perpendicular to the axis thereof, a mounting surrounding the lens barrel, a plurality of radial outwardly extending springs connected at their inner ends with said mounting and anchored at their outer ends to supports fixed to the camera for resiliently suspending the mounting in spaced relation to the lens barrel, a stop element having a plurality of fixed stop openings, and means carried by the mounting for supporting said stop element for guided step by step movement through said passageway to successively dispose the stop openings in registration with the camera lens.

11. In a camera, a lens barrel having fixed relation to the camera and provided with a passageway extending completely therethrough perpendicular to the axis thereof, a mounting surrounding the lens barrel, a plurality of pairs of radial outwardly extending springs, each pair of springs being connected at their nner ends with said mounting at axially spaced points and converging outwardly and anchored at their outer ends to supports having adjustable fixed relation with the camera for resiliently suspending the mounting in spaced relation to the lens barrel, a stop element having a plurality of fixed stop openings, and means for supporting said stop element for guided step by step movement through said passageway to successively dispose the stop openings in registration with the camera lens.

12. In a camera stop device, a lens barrel having oppositely disposed slots, lens components supported by the barrel on opposite sides of said slots, a stop element, a housing having oppositely disposed slots registering with the lens barrel slots through which the stop element extends, and yieldable means adjacent the housing slots engageable with the stop element for preventing unrefracted light from entering through said slots and striking the rear lens component.

13. In a camera stop device, a lens barrel having oppositely disposed slots, lens components supported by the barrel on opposite sides of said slots, a stop element, a housing surrounding the lens barrel and provided with oppositely disposed slots in registry with the barrel slots and through which slots the stop element extends, and pairs of brushes carried by the housing adjacent the slots therein and having resilient bristles arranged in confronting relation with each other and on opposite sides of the said slots for preventing access of light into the lens barrel between the lens components through said housing slots.

14. In a camera stop device, a stop element provided with a plurality of fixed stop openings, means for guiding the movement of the stop element to successively dispose the stop openings in registration with the camera lens, means for arresting the movement of said stop element, means for adjusting said last named means so as to effect proper registry of said stop openings with the lens, and a mounting for said stop element guiding and arresting means resiliently suspended with reference to the camera lens barrel.

15. In a camera stop device, a stop element including a stop plate having a plurality of fixed stop openings and a holder therefor having laterally spaced side ledges and a lower ledge for properly positioning and maintaining the same in a predetermined relation to the stop holder, a fixed magnet on said holder for detachably connecting the stop plate therewith, and means for guiding and arresting the movement of said stop element to successively dispose the stop openings of the stop plate in registration with the camera lens.

16. In a camera stop device, a stop element having a plurality of fixed stop openings, means for guiding the stop element for movement to successively dispose the stop openings in registration with the camera lens, and means for arresting the movement of said stop element including notched portions of the stop element, a pivoted trip lever, a spring having an intermediate looped portion secured to said lever, and free terminals adapted to be alternately shifted to a position to spring into engagement with the notched portions of the stop element.

AUGUST C. HANSCH.
HENRY E. HANSCH.